US012565133B2

(12) United States Patent
Kiyokami et al.

(10) Patent No.: US 12,565,133 B2
(45) Date of Patent: Mar. 3, 2026

(54) VEHICLE FOR PARCEL DELIVERY

(71) Applicant: TOYOTA JIDOSHA KABUSHIKI KAISHA, Toyota (JP)

(72) Inventors: Hiroaki Kiyokami, Nisshin (JP); Masao Tajima, Toyota (JP)

(73) Assignee: TOYOTA JIDOSHA KABUSHIKI KAISHA, Toyota Aichi-ken (JP)

( * ) Notice: Subject to any disclaimer, the term of this patent is extended or adjusted under 35 U.S.C. 154(b) by 353 days.

(21) Appl. No.: 18/140,148

(22) Filed: Apr. 27, 2023

(65) Prior Publication Data

US 2023/0347809 A1     Nov. 2, 2023

(30) Foreign Application Priority Data

May 2, 2022     (JP) ................................. 2022-076274

(51) Int. Cl.
| | |
|---|---|
| *B60P 3/00* | (2006.01) |
| *B60P 1/44* | (2006.01) |
| *B62D 25/06* | (2006.01) |
| *B60W 60/00* | (2020.01) |

(52) U.S. Cl.
CPC ............. *B60P 3/007* (2013.01); *B60P 1/4421* (2013.01); *B62D 25/06* (2013.01); *B60W 60/00256* (2020.02)

(58) Field of Classification Search
CPC .. B60P 3/00; B60P 3/055; B60P 3/007; B65G 65/00; B65G 1/10
See application file for complete search history.

(56) References Cited

U.S. PATENT DOCUMENTS

| | | | | |
|---|---|---|---|---|
| 11,787,669 | B2 * | 10/2023 | Kiyokami | B66C 13/48 |
| | | | | 701/23 |
| 11,993,194 | B2 * | 5/2024 | Kiyokami | B60P 3/007 |
| 2017/0121023 | A1 * | 5/2017 | High | B64D 9/00 |
| 2019/0113935 | A1 * | 4/2019 | Kuo | G06Q 50/40 |
| 2020/0175471 | A1 | 6/2020 | Tsuruta et al. | |
| 2020/0207250 | A1 | 7/2020 | Jarvis et al. | |
| 2021/0209543 | A1 * | 7/2021 | Scott | G06Q 10/083 |

(Continued)

FOREIGN PATENT DOCUMENTS

| | | |
|---|---|---|
| CN | 114312528 A | 4/2022 |
| DE | 102016007467 A1 | 2/2017 |

(Continued)

*Primary Examiner* — Kaitlin S Joerger
(74) *Attorney, Agent, or Firm* — Dinsmore & Shohl LLP

(57) ABSTRACT

A parcel delivery vehicle includes a door opening provided in a left side part of a vehicle, a parcel storage compartment provided inside the vehicle to store a parcel, and a parcel handling device configured to convey the parcel between a first delivery reception position and a second delivery reception position and receive the parcel from the parcel storage compartment at the first delivery reception position and transfer the parcel to a worker or an unmanned transport device at the second delivery reception position. The parcel storage compartment is provided on a front side and/or a rear side of the parcel handling device in the vehicle. The parcel handling device is provided in a vicinity of a right side part and at a position facing the door opening in a vehicle width direction, and the second delivery reception position is set between the parcel handling device and the door opening.

10 Claims, 8 Drawing Sheets

(56)     References Cited

U.S. PATENT DOCUMENTS

| | | | |
|---|---|---|---|
| 2021/0380016 A1 | 12/2021 | Cha et al. | |
| 2021/0387808 A1* | 12/2021 | Kalouche | ................ B60P 3/007 |
| 2022/0097591 A1 | 3/2022 | Kiyokami | |
| 2022/0097970 A1* | 3/2022 | Kiyokami | ............. B60P 1/4421 |
| 2023/0202682 A1* | 6/2023 | Kiyokami | ............. B64U 70/90 |
| | | | 244/114 R |

FOREIGN PATENT DOCUMENTS

| | | | |
|---|---|---|---|
| DE | 102018205880 B3 | 7/2019 | |
| DE | 102018211567 A1 | 1/2020 | |
| DE | 102020212541 A1 | 12/2021 | |
| DE | 102022202307 A1 | 9/2023 | |
| JP | 2013-215596 A | 10/2013 | |
| JP | 2016-153337 A | 8/2016 | |
| JP | 2018-165205 A | 10/2018 | |
| JP | 2020-090152 A | 6/2020 | |
| JP | 2021-195012 A | 12/2021 | |
| JP | 2022-056156 A | 4/2022 | |

* cited by examiner

VEHICLE FOR PARCEL DELIVERY

CROSS REFERENCE TO RELATED APPLICATION

This application claims priority to Japanese Patent Application No. 2022-076274 filed on May 2, 2022, which is incorporated herein by reference in its entirety including the specification, claims, drawings, and abstract.

TECHNICAL FIELD

The present specification discloses a parcel delivery vehicle for use in delivering parcels.

BACKGROUND

Vehicles such as trucks have been conventionally used to deliver parcels. Parcels to be delivered are stored inside such vehicles. When a vehicle arrives at a location near an intended delivery destination, a worker takes a designated parcel out of this vehicle and finally delivers the parcel to the delivery destination. In recent years, it has also been proposed to use unmanned transport devices such as unmanned ground vehicles (hereinafter, referred to as "UGVs") and drones, in replacement of workers, to perform delivery tasks from vehicles to delivery destinations. For example, Patent Literature 1 discloses a technique in which a vehicle is provided with a drone port on the top thereof to enable a drone to land thereon, receive a parcel from inside the vehicle, and transport the received parcel to a delivery destination.

CITATION LIST

PATENT LITERATURE 1: DE 102016007467 A1

In general, the delivery of a parcel from a vehicle to a delivery destination requires a job of taking the parcel out from the vehicle, namely, a parcel handling job. Conventionally, such parcel handling jobs have been performed by workers. However, it takes time and labor for workers to perform such parcel handling jobs. Further, it is generally intended to use unmanned transport devices for reduction of man power. In the case of using such unmanned transport devices to deliver parcels to delivery destinations, if the parcel handling jobs are carried out by workers, the man power cannot be sufficiently reduced and the merit of using such unmanned transport devices is decreased.

Therefore, it is conceivable to provide a vehicle with a parcel handling device that can automatically take a parcel out from the vehicle and pass the parcel to a worker or an unmanned transport device. However, if such a parcel handling device is installed on the vehicle, there will be a concern that the space for a parcel storage compartment will be greatly reduced or that the space to enable the unmanned transport device to enter may not be sufficiently secured. Therefore, providing a vehicle with a parcel handling device necessitates considering an innovative layout capable of effectively utilizing the space of the vehicle. However, there is no conventionally considered layout satisfying such requirements.

To this end, the present specification discloses a parcel delivery vehicle that can more effectively utilize the space inside the vehicle.

SUMMARY

A parcel delivery vehicle disclosed in the present specification includes a door opening provided in a first side part of a vehicle so as to be opened and closed with a door, a parcel storage compartment provided inside the vehicle to store a parcel, and a parcel handling device configured to convey the parcel between a first delivery reception position and a second delivery reception position and deliver and receive the parcel to and from the parcel storage compartment at the first delivery reception position. The parcel storage compartment is provided on a front side or a rear side, or on both of the front and rear sides, of the parcel handling device in the vehicle, the parcel handling device is provided in a vicinity of a second side part that is a side part opposite to the first side part in the vehicle and at a position facing the door opening in a vehicle width direction, and the second delivery reception position is set between the parcel handling device and the door opening.

Installing the parcel handling device in the vicinity of the second side part and at the position facing the door opening in the vehicle width direction can secure a work space for enabling a UGV or a worker to get in and work at a location immediately accessible from the door opening. In addition, installing the parcel handling device at the position facing the door opening in the vehicle width direction can simplify the shape of the parcel storage compartment set on the front side and/or the rear side of the parcel handling device and can effectively prevent the occurrence of a dead space. As a result, the above-described configuration can effectively utilize the space inside the vehicle.

In this case, the work space that is a space extending from the parcel handling device to the door opening may not be provided with the parcel storage compartment and a vehicle interior floor surface of the work space may be flat.

Flattening the floor surface of the work space enables a UGV to smoothly enter the work space.

Further, the parcel may be delivered in corporation with an unmanned transport device, and the unmanned transport device may include a drone. Further, the parcel delivery vehicle may have a drone port provided on an outer surface of a ceiling of the vehicle to enable the drone to land thereon, and a roof opening formed in the ceiling so that the parcel can pass. Further, the parcel delivery vehicle may include an auxiliary parcel handling device configured to transport the parcel received from either the parcel handling device or the drone through the roof opening, and transfer the parcel to the other of the parcel handling device and the drone.

Providing the auxiliary parcel handling device makes it possible to locate the parcel handling device at a position offset from the roof opening in the horizontal direction. In addition, this arrangement makes it possible to install the parcel handling device at a location where the parcel can be easily delivered to and received from a UGV or a worker.

Further, the roof opening may be formed so as to be positioned at substantially a center in the vehicle width direction.

Such a configuration makes it possible to set a landing position for the drone that receives the parcel through the roof opening to the center of the vehicle in the vehicle width direction. Further, setting the landing position to the center of the vehicle in the vehicle width direction enables the drone to stably take off and land.

Further, the unmanned transport device may include an unmanned ground vehicle (UGV) that travels unmanned on roads. The second delivery reception position may include an UGV dedicated delivery reception position where the parcel is delivered to and received from the unmanned ground vehicle, and a drone dedicated delivery reception position where the parcel is delivered to and received from the auxiliary parcel handling device. The UGV dedicated delivery reception position and the drone dedicated delivery reception position may be matched in a horizontal direction and offset in a vertical direction.

Such a configuration makes it possible to utilize both the UGV and the drone for delivery of the parcel. Further, matching the UGV dedicated delivery reception position and the drone dedicated delivery reception position in the horizontal direction can simplify the movement of the parcel handling device.

Further, the parcel handling device may include a main pillar with a lower end fixed to the vehicle interior floor surface and a parcel holding part that holds the parcel, rotates about the main pillar, and moves up and down along the main pillar. The parcel holding part may be rotated and moved up and down after the parcel is received at one of the first delivery reception position and the second delivery reception position, so that the parcel can be conveyed to the other of the first delivery reception position and the second delivery reception position.

Such a configuration can simplify the configuration of the parcel handling device.

In this case, the vehicle may have a cross member as a skeleton member extending in the vehicle width direction in a bottom part of the vehicle, and the main pillar may be provided at a position overlapping with the cross member in a plan view.

The floor surface around the cross member is hard to bend and is stable. Therefore, providing the main pillar so as to overlap with the cross member can further stabilize the main pillar.

Further, the main pillar may have an upper end fixed to the ceiling of the vehicle.

Such a configuration makes it possible to improve the rigidity of the vehicle body since the main pillar can function as a support bar.

Further, the vehicle may have a roof cross member as a skeleton member extending in the vehicle width direction, in a top part of the vehicle, and the main pillar may be provided at a position overlapping with the roof cross member, in a plan view.

Such a configuration makes it possible to effectively transmit and distribute a load acting on the ceiling of the vehicle to a lower side of the vehicle. As a result, it is possible to effectively prevent the ceiling from distorting.

Further, the main pillar may have an upper end not fixed to the ceiling of the vehicle.

Such a configuration makes it possible to prevent a load acting on the ceiling of the vehicle from being transmitted to the main pillar. As a result, it is possible to effectively suppress bending of the main pillar.

According to the parcel delivery vehicle disclosed in the present specification, the space inside the vehicle can be more effectively utilized.

BRIEF DESCRIPTION OF DRAWINGS

Embodiment(s) of the present disclosure will be described based on the following figures, wherein.

DESCRIPTION OF EMBODIMENTS

Figure 1:
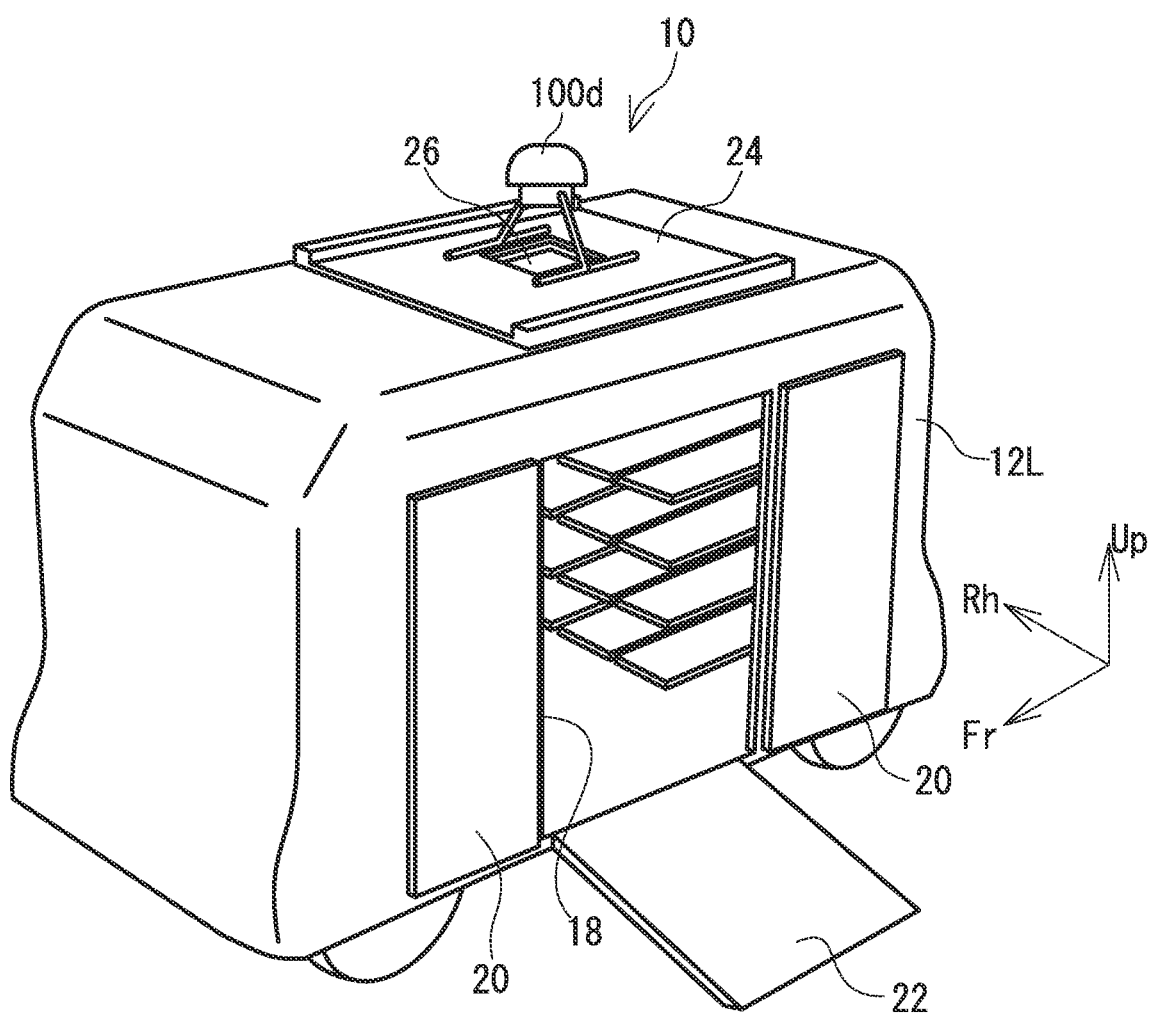
FIG. 1 is a perspective diagram illustrating a parcel delivery vehicle.
Figure 2:
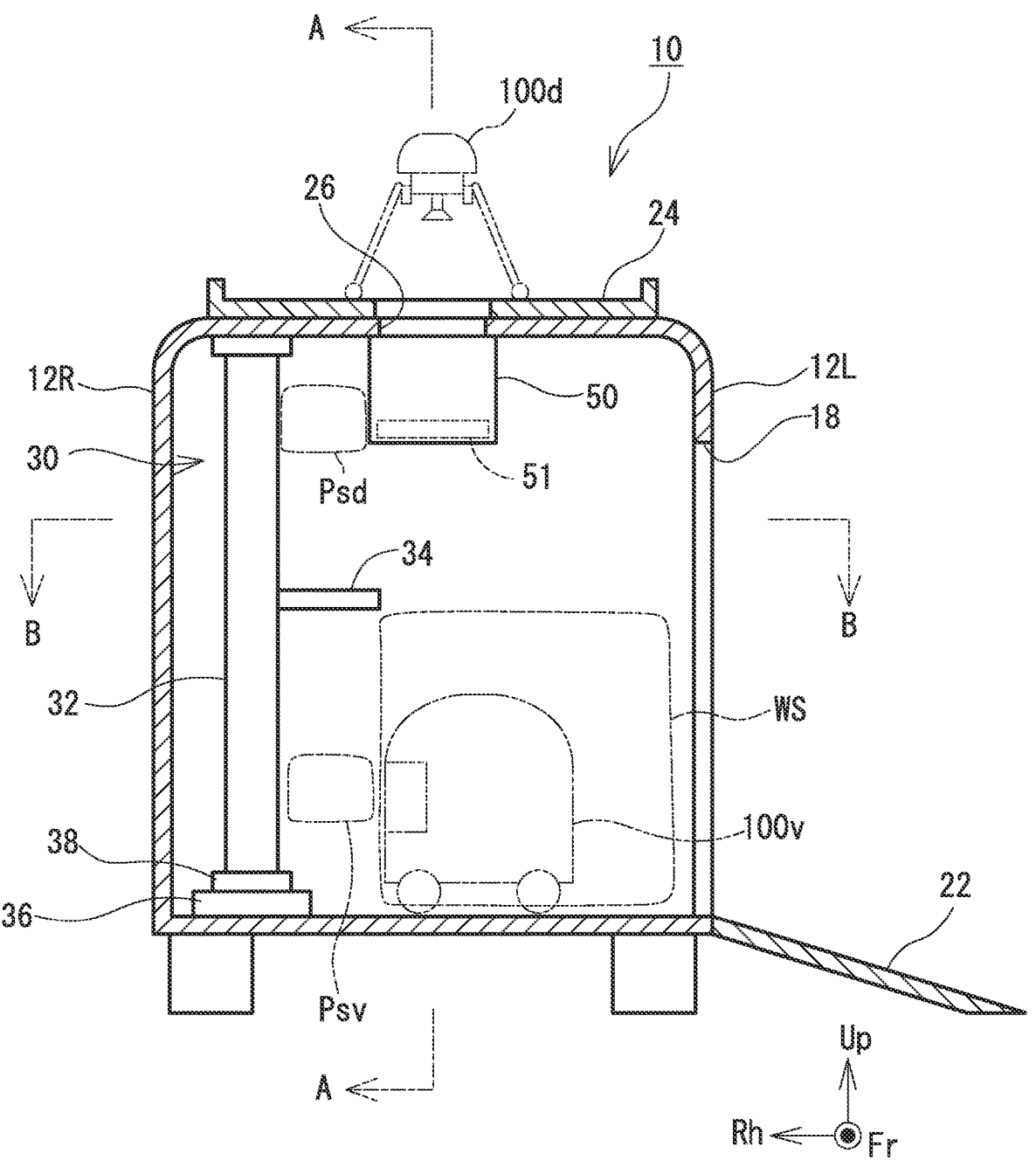
FIG. 2 is a vertical cross-sectional diagram illustrating the parcel delivery vehicle taken along a plane parallel to the up-and-down direction and the vehicle width direction.
Figure 3:
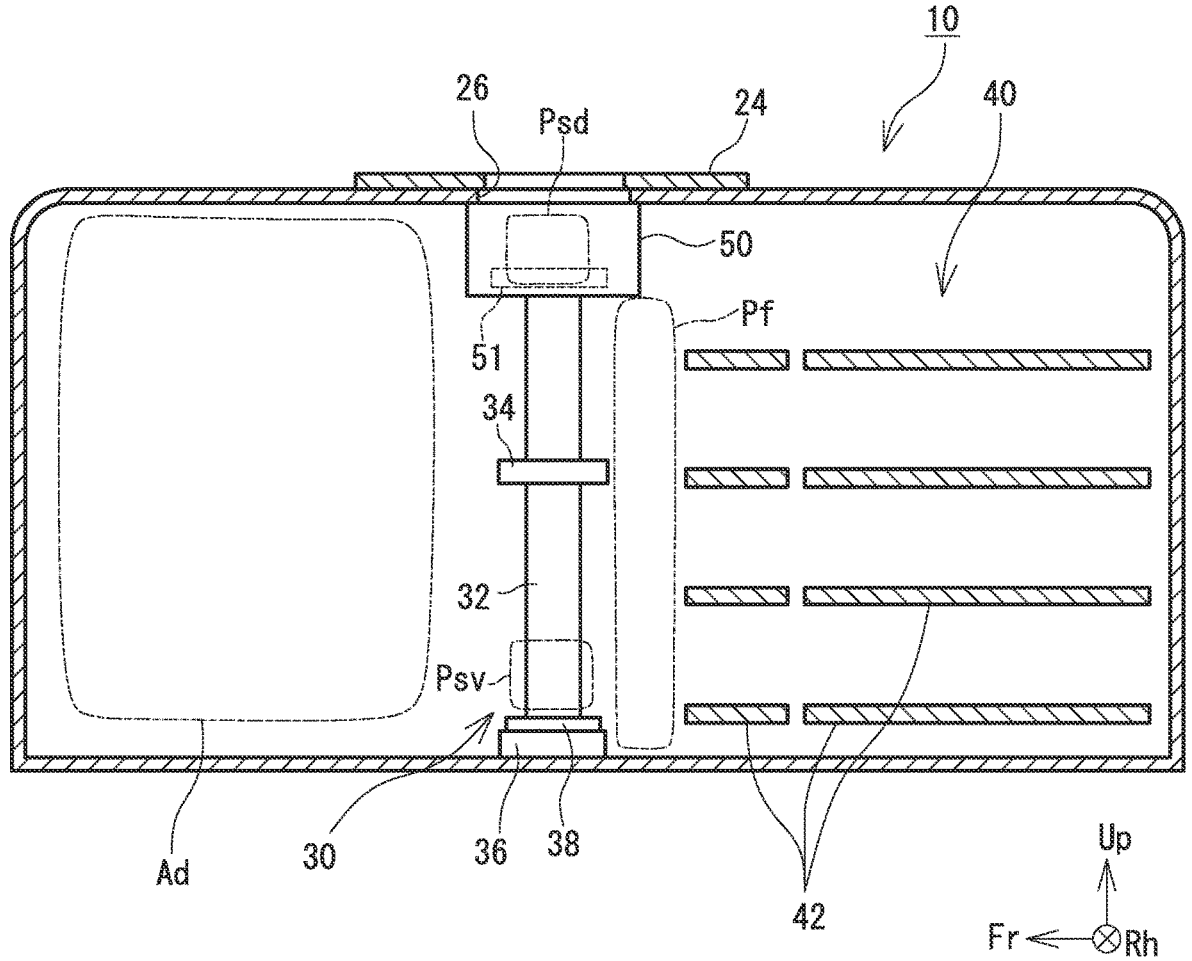
FIG. 3 is a cross-sectional diagram taken along a line A-A in FIG. 2.
Figure 4:
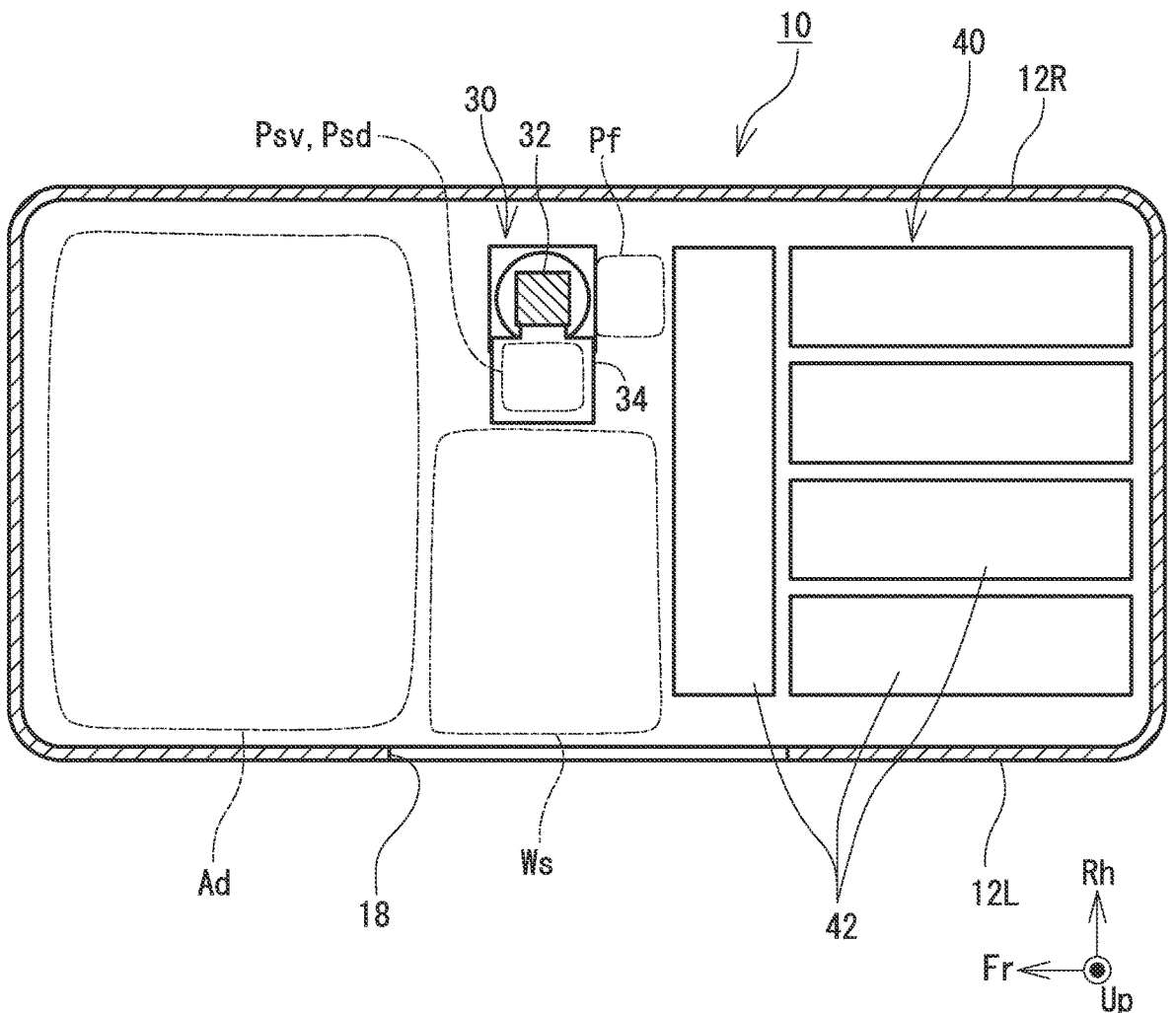
FIG. 4 is a cross-sectional diagram taken along a line B-B in FIG. 2.

Hereinafter, an exemplary configuration of a parcel delivery vehicle (hereinafter, simply referred to as a "vehicle") 10 will be described with reference to attached drawings. FIG. 1 is a perspective diagram illustrating the vehicle 10. FIG. 2 is a vertical cross-sectional diagram illustrating the vehicle 10 taken along a plane parallel to the up-and-down direction and the vehicle width direction. Further, FIG. 3 is a cross-sectional diagram taken along a line A-A in FIG. 2, and FIG. 4 is a cross-sectional diagram taken along a line B-B in FIG. 2. In each drawing, "Fr", "Up", and "Rh" stand for front, upper, and right sides of the vehicle 10, respectively.

This vehicle 10 delivers each parcel to a designated delivery destination in corporation with an unmanned transport device. Examples of the unmanned transport device include, for example, a UGV 100$v$ that travels on the ground to transport parcels and a drone 100$d$ that flies to transport parcels (although no propeller is illustrated in FIGS. 1 and 2). In the following description, the UGV 100$v$ and the drone 100$d$ may be collectively referred to as "unmanned transport device 100" if it is unnecessary to discriminate them from each other. In general, the unmanned transport device 100 is compact when compared to the vehicle 10. Therefore, the unmanned transport device 100 is capable of entering not only various sites of private houses but also indoor spaces, and therefore has mobility. On the other hand, the unmanned transport device 100 has a shorter cruising distance than the vehicle 10. Therefore, in the present example, the unmanned transport device 100 is in charge of transportation to each delivery destination from the vicinity thereof, and the vehicle 10 having a longer cruising distance transports parcels from a predetermined starting position to the vicinity of each delivery destination.

Specifically, the vehicle 10 loaded with a plurality of parcels moves from the predetermined starting position to a pre-designated object position. In general, the object position is set to a position from which the unmanned transport device 100 can easily access to any of delivery destinations of the plurality of parcels. After the vehicle 10 arrives at the object position, the unmanned transport device 100 takes out each parcel from the vehicle 10 and transports the parcel to the delivery destination thereof. The transfer of each parcel from the vehicle 10 to the unmanned transport device 100 is automatically performed by a parcel handling device 30 described below, without human intervention.

Next, an exemplary configuration of the vehicle 10 will be described. The vehicle 10 of the present example has a substantially boxlike appearance including a front face and a rear face standing up almost vertically, as illustrated in FIG. 1. The vehicle 10 has a left side part 12L with a door opening 18 formed to enable a worker or the UGV 100$v$ to get on and off. The door opening 18 is positioned at substantially the center of the vehicle 10 in the back-and-forth direction, and is covered with a door 20 so as to be freely opened and closed. The vehicle 10 in FIG. 1 is assumed to be used in a traffic controlled area in which the left-side travelling of vehicles is stipulated. Accordingly, the left side part 12L, in which the door opening 18 is formed, can be said to be a side part on the sidewalk side. Forming the door opening 18 in the side part on the sidewalk side (i.e., in the left side part 12L) in this manner enables the UGV 100v or a worker to easily come and go between the sidewalk and the inside of the vehicle. However, when the vehicle 10 is used in another traffic controlled area where the right-side travelling of vehicles is stipulated, the door opening 18 may be formed in a right side part 12R that is a side part on the sidewalk side. When the UGV 100v boarded or alighted from, a slope 22 is stretched over from a lower end of the door opening 18 toward a road surface.

A drone port 24 is provided on an outer surface of the ceiling of the vehicle 10 to enable the drone 100d to land thereon. The drone port 24 is a reinforced part of the ceiling to withstand impacts when the drone 100d takes off and lands thereon. In the present example, the drone port 24 is located at substantially the center in the vehicle back-and-forth direction. Therefore, the drone 100d lands on substantially the center in the vehicle back-and-forth direction and substantially the center in the vehicle width direction, of the ceiling of the vehicle.

A roof opening 26 through which each parcel can pass is formed on the ceiling of the vehicle 10. The roof opening 26 is formed at substantially the center in the vehicle back-and-forth direction and at substantially the center in the vehicle width direction, of the ceiling. Accordingly, the roof opening 26 can be located almost directly below the drone 100d that has landed on the drone port 24.

A parcel storage compartment 40 is provided together with the parcel handling device 30 in the vehicle 10. The parcel storage compartment 40 is an area in which a plurality of parcels can be stored. In the present example, as illustrated in FIG. 3, a part of the vehicle interior space on the rear side of the parcel handling device 30 is defined as the parcel storage compartment 40. For example, a conveyance shelf 42 is arranged in the parcel storage compartment 40. The conveyance shelf 42 can accommodate a plurality of parcels and automatically convey a designated parcel among the accommodated parcels to a position adjacent to a first delivery reception position Pf described below. Mechanisms adopted in automated warehouses may be directly used for the conveyance shelf 42. For example, the conveyance shelf 42 has a crane capable of picking up and moving the designated parcel, a conveyor capable of transporting the designated parcel, or the like.

The parcel handling device 30 is a device configured to take out a specific parcel from the parcel storage compartment 40 and transfer the parcel to the unmanned transport device 100. Hereinafter, the position where the parcel handling device 30 delivers and receives parcels to and from the parcel storage compartment 40 is referred to as "first delivery reception position Pf" (see FIGS. 3 and 4). The position where the parcel handling device 30 delivers and receives parcels to and from the UGV 100v is referred to as "UGV dedicated delivery reception position Psv". The position where the parcel handling device 30 delivers and receives parcels to and from the drone 100d is referred to as "drone dedicated delivery reception position Psd" (see FIGS. 2 to 4). Further, the UGV dedicated delivery reception position Psv and the drone dedicated delivery reception position Psd may be collectively referred to as "second delivery reception position Ps" if it is unnecessary to discriminate them from each other.

As illustrated in FIGS. 2 and 4, the installation position of the parcel handling device 30 is the vicinity of the right side part 12R and faces the door opening 18 in the vehicle width direction. Here, "the vicinity of the right side part 12R" means a position closer to the right side part 12R than the center of the vehicle 10 in the vehicle width direction. Accordingly, in the present example, the distance from a right edge of the parcel handling device 30 to the right side part 12R is shorter than the distance from a left edge of the parcel handling device 30 to the center of the vehicle 10 in the vehicle width direction.

The space between the parcel handling device 30 and the door opening 18 serves as a work space WS into which the UGV 100v or each worker can enter. Understandably, the parcel storage compartment 40 is not provided in the work space WS. The work space WS has a sufficient size to entirely accommodate the UGV 100v. Further, a floor surface of the work space WS is flat so that the UGV 100v can move smoothly.

The parcel handling device 30 has a base 36, a rotary table 38, a main pillar 32, and a parcel holding part 34. The base 36 is fixed to the vehicle interior floor surface. The rotary table 38 is rotatable with respect to the base 36. The parcel handling device 30 has a power source (e.g., a motor) that rotates the rotary table 38. The main pillar 32 stands vertically from the rotary table 38 and rotates together with the rotary table 38.

The parcel holding part 34 is a substantially plate-shaped member on which each parcel can be placed. The parcel holding part 34 can be moved up and down along the main pillar 32 by a lifting mechanism (not illustrated). Since there are various known lifting mechanisms usable as the lifting mechanism, detailed description thereof will be omitted here. Further, the parcel holding part 34 can rotate around the main pillar 32 together with the main pillar 32 when the rotary table 38 rotates. The parcel holding part 34 conveys each parcel between the first delivery reception position Pf and the second delivery reception position Ps by combining up-and-down and rotational motions. Since configurations of stacker cranes adopted, for example, in automated warehouses may be directly used to configure the parcel holding part 34, detailed description thereof will be omitted here.

As illustrated in FIGS. 3 and 4, in the present example, the first delivery reception position Pf where each parcel is delivered to and received from the parcel storage compartment 40 is located between the main pillar 32 and the parcel storage compartment 40, that is, immediately behind the main pillar 32. Further, as illustrated in FIGS. 2 and 4, the second delivery reception position Ps where each parcel is delivered to and received from the unmanned transport device 100 is located on an immediately left side of the main pillar 32. The second delivery reception position Ps will be described in more detail. The UGV dedicated delivery reception position Psv is stipulated to have the same height as the position where the UGV 100v receives each parcel, immediately on the left side of the main pillar 32. Further, the drone dedicated delivery reception position Psd is stipulated to have the same height as an auxiliary parcel handling device 50 described below, immediately on the left side of the main pillar 32. That is, the UGV dedicated delivery reception position Psv and the drone dedicated delivery reception position Psd are matched in the horizontal direction and are offset in the vertical direction.

As illustrated in FIGS. 3 and 4, a vehicle interior portion on the front side of the parcel handling device 30 serves as a driver's seat area Ad where a driver (not illustrated) can be seated. In the driver's seat area Ad, there are a chair on which the driver sits, a steering wheel, a display device, and the like (although none of these are illustrated in the drawings) that are arranged appropriately.

Further, the vehicle 10 is provided with the auxiliary parcel handling device 50. The auxiliary parcel handling device 50 is a device configured to relay each parcel to be delivered and received between the parcel handling device 30 and the drone 100*d*. The auxiliary parcel handling device 50 is fixed to the ceiling in the vehicle interior, as illustrated in FIGS. 2 and 3. Further, the installation position of the auxiliary parcel handling device 50 is adjacent to the parcel handling device 30 on the center side in the vehicle width direction, and is directly below the roof opening 26, as illustrated in FIG. 2.

The auxiliary parcel handling device 50 has a pallet 51 that can hold the parcel (see FIGS. 2 and 3). The pallet 51 is movable in the up-and-down direction and can pass the roof opening 26. The auxiliary parcel handling device 50, as required, receives a parcel placed on the pallet 51 from the parcel handling device 30, then moves the pallet 51 upward to convey the parcel to the drone port 24, and transfers the parcel to the drone 100*d*.

Next, the delivery of parcels by the vehicle 10 will be simply described. As described above, the vehicle 10 transports parcels to an object position set in the vicinity of delivery destinations of respective parcels. When the vehicle 10 arrives at the object position, the unmanned transport device 100 transports each parcel from the vehicle 10 to the delivery destination thereof.

First, an exemplary case of transporting a parcel with the UGV 100*v* will be described. In this case, the UGV 100*v* may be mounted in advance in the work space WS of the vehicle 10 at an appropriate time preceding the arriving at the object position. Alternatively, after the vehicle 10 arrives at the object position, the UGV 100*v* may pass through the door opening 18 from outside the vehicle and enter the work space WS.

The parcel handling device 30 moves the parcel holding part 34 to the first delivery reception position Pf. Further, the conveyance shelf 42 transfers an object parcel to the parcel holding part 34 located at the first delivery reception position Pf. When the transfer of the parcel to the parcel holding part 34 completes, the parcel handling device 30 rotates and vertically moves the parcel holding part 34 to shift the parcel holding part 34 to the UGV dedicated delivery reception position Ps. Subsequently, the parcel handling device 30 transfers the parcel located at the UGV dedicated delivery reception position Psv to the UGV 100*v*. The UGV 100*v*, after completing the reception of the parcel, passes through the door opening 18 and moves out of the vehicle to transport the parcel to the delivery destination.

Next, another exemplary case of transporting a parcel with the drone 100*d* will be described. In this case, the drone 100*d* may stand by at the drone port 24 before the vehicle 10 arrives at the object position. Alternatively, the drone 100*d* may fly to the drone port 24 after the vehicle 10 has arrived at the object position.

In any case, the case of using the drone 100*d* for parcel transportation is not so different from the case of using the UGV 100*v* in that the object parcel is first received by the parcel handling device 30 from the conveyance shelf 42. That is, the parcel handling device 30 moves the parcel holding part 34 to the first delivery reception position Pf and the conveyance shelf 42 transfers the object parcel to the parcel holding part 34 positioned at the first delivery reception position Pf.

Subsequently, the parcel handling device 30 rotates and vertically moves the parcel holding part 34 to move the parcel holding part 34 to the drone dedicated delivery reception position Psd. Thereafter, the parcel handling device 30 shifts the parcel in the parcel holding part 34 to the pallet 51 of the auxiliary parcel handling device 50, and transfers the parcel to the auxiliary parcel handling device 50.

The auxiliary parcel handling device 50 moves the pallet 51 upward to transport the parcel to a position higher than the ceiling (i.e., to the outside of the vehicle), and transfers the parcel to the drone 100*d*. Upon receiving the parcel, the drone 100*d* takes off from the drone port 24 and transports the parcel to the delivery destination.

As is apparent from the above description, the vehicle 10 of the present example has the parcel handling device 30 provided therein, and the parcel handling device 30 transfers parcels from the parcel storage compartment 40 to the unmanned transport device 100. This eliminates the need for workers who work for parcel handling, and can reduce the man power. As a result, it becomes possible to deliver parcels more efficiently.

Here, as described above, in the present example, the installation position of the parcel handling device 30 is the vicinity of the right side part 12R opposite to the left side part 12L with the door opening 18 formed therein, and faces the door opening 18 in the vehicle width direction. Further, the installation position of the parcel storage compartment 40 is behind the parcel handling device 30. Such an arrangement makes it possible to effectively utilize the space inside the vehicle so that the parcel storage compartment 40 and the work space WS can be sufficiently secured.

Figure 5:
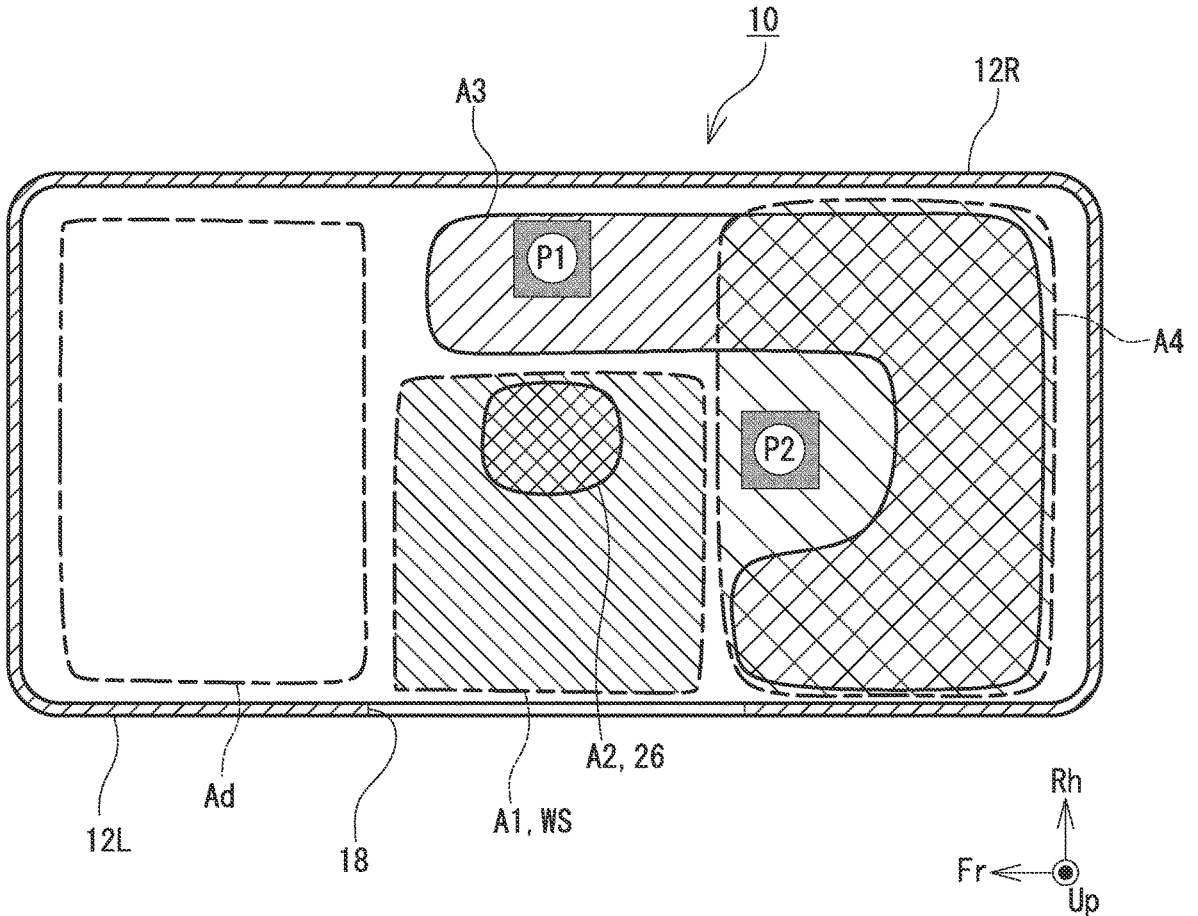
FIG. 5 is a schematic diagram illustrating the layout of the parcel delivery vehicle viewed from directly above.

This will be described in more detail with reference to FIG. 5. FIG. 5 is a schematic diagram illustrating the layout of the vehicle 10 viewed from directly above. The UGV 100*v* enters the vehicle through the door opening 18 and receives an intended parcel. Accordingly, it is necessary to secure, as the work space WS, an area A1 having a size sufficient to entirely accommodate the UGV 100*v*, which is an area immediately accessible from the door opening 18, in the vehicle. Further, since the drone 100*d* cannot stably land in four corners of the ceiling, it is safer for the drone 100*d* to land in the center of the ceiling in the vehicle width direction. Therefore, the roof opening 26 through which each parcel passes when the parcel is transferred to the drone 100*d* is usually formed in an area A2 that is positioned in the center in the vehicle width direction.

To enable the parcel handling device 30 to properly transfer parcels to the UGV 100*v* and the drone 100*d*, the parcel handling device 30 is required to be arranged adjacently to the work space WS and the roof opening 26. Accordingly, the position conceivable for arranging the parcel handling device 30 is a position P1 on a side opposite to the door opening 18 with the intervening work space WS, or a position P2 adjacent to the work space WS in the rear part of the vehicle.

If the parcel handling device 30 is arranged at the position P2, the parcel storage compartment 40 will be required to be positioned in a region in which the parcel storage compartment 40 does not hinder the parcel handling device 30 located at the position P2, that is, in an area A3 in FIG. 5. Accordingly, the shape thereof becomes very complicated. In this case, the configuration of the conveyance shelf 42 for accommodating parcels will become complicated and the dead space will increase. As a result, arranging the parcel handling device 30 at the position P2 may decrease the effective space for the parcel storage compartment 40 and lower the parcel accommodation efficiency.

On the other hand, in the case of locating the parcel handling device 30 at the position P1, that is, in the vicinity of the right side part 12R, and at the position facing the door opening 18 in the vehicle width direction, the parcel storage compartment 40 comes to be formed in an area A4 on the rear side of the parcel handling device 30 and the rear side of the work space WS in the vehicle. As is apparent from FIG. 5, the area A4 has a simple shape that is substantially rectangular. Therefore, the configuration of the conveyance shelf 42 for conveying parcels can be simplified. In addition, the dead space is less likely to occur. In short, arranging the parcel handling device 30 so as to face the door opening 18 in the vehicle width direction and in the vicinity of the side part opposite to the door opening 18 (i.e., the right side part 12R) makes it possible to effectively utilize the internal space of the vehicle 10.

Further, although the work space WS is positioned between the parcel handling device 30 and the door opening 18, the floor surface of the work space WS is formed to be flat in the present example. Therefore, the UGV 100v can smoothly enter the work space WS and the workability of the UGV 100v can be improved.

Further, the above-described example includes the provision of the auxiliary parcel handling device 50 that relays the parcel handling device 30 and the drone 100d. Providing the auxiliary parcel handling device 50 makes it possible to arrange the parcel handling device 30 at the position offset from the roof opening 26 in the horizontal direction. In other words, the parcel handling device 30 can be provided at the position where each parcel can be easily delivered to and received from the UGV 100v. As a result, parcels can be smoothly transferred from the parcel handling device 30 to the UGV 100v.

Further, providing the auxiliary parcel handling device 50 makes it possible to set the UGV dedicated delivery reception position Psv and the drone dedicated delivery reception position Psd at the same position in the horizontal direction and at different positions offset in the vertical direction. Further, adopting such an arrangement can simplify the movement of the parcel handling device 30 and also simplify the configuration and control of the parcel handling device 30.

Figure 6:
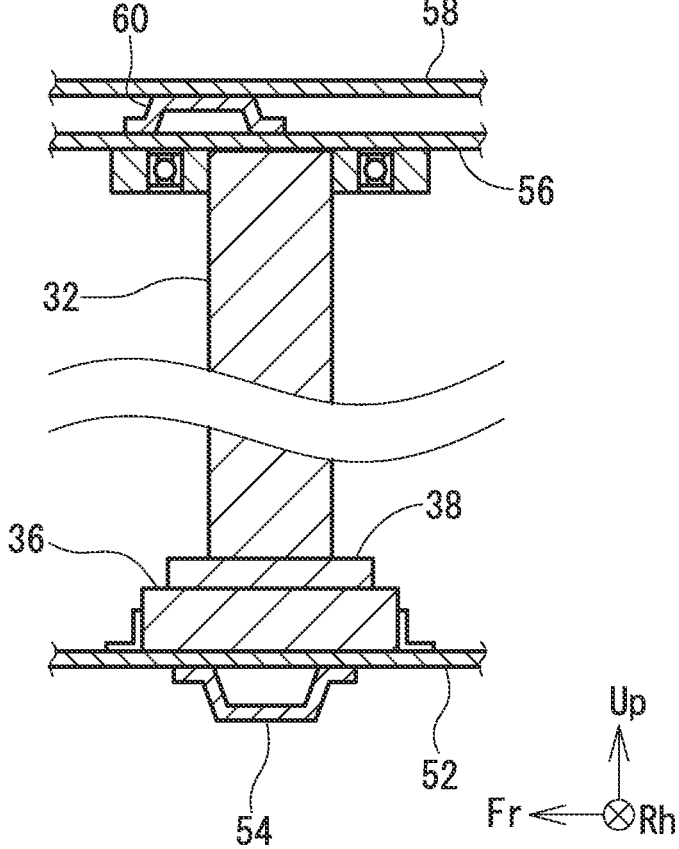
FIG. 6 is a cross-sectional diagram illustrating upper and lower ends of a main pillar.

Further, the present example includes the provision of the main pillar 32 of the parcel handling device 30, in which the installation position of the main pillar 32 overlaps with a cross member 54 and a roof cross member 60. This will be described with reference to FIG. 6. FIG. 6 is a cross-sectional diagram illustrating upper and lower ends of the main pillar 32.

In general, a pair of side members (not illustrated) extending in the vehicle back-and-forth direction and a plurality of cross members 54 stretched over between the pair of side members are provided in a bottom part of the vehicle 10. The cross member 54 is a type of skeleton member that supports the vehicle 10. For example, the cross member 54 can be configured by joining, to a floor panel 52, a press-molded member having a hat-shaped cross section and elongated in the vehicle width direction, as illustrated in FIG. 6. Among portions constituting the bottom part of the vehicle 10, it can be said that the vicinity of the cross member 54 is a portion that is hard to bend and has rigidity. In the present example, the installation position of the main pillar 32 overlaps with the cross member 54 in a plan view. Such a configuration makes it possible to improve the stability of the main pillar 32 and, as a result, parcels can be conveyed more stably.

Further, in the present example, the upper end of the main pillar 32 is fixed to the ceiling of the vehicle 10. Such a configuration enables the main pillar 32 to function as a support bar intervening between the floor surface and the ceiling and, as a result, effectively suppresses distortion of the vehicle body and bending of the ceiling, and makes it possible to improve the rigidity of the vehicle body.

Here, a pair of roof rails (not illustrated) extending in the vehicle back-and-forth direction, and a plurality of roof cross members 60 stretched over the pair of roof rails, are provided on the ceiling of the vehicle 10. The roof cross member 60 is a type of skeleton member that reinforces the ceiling of the vehicle 10. For example, the roof cross member 60 can be configured by joining, to a roof inner panel 56 or a roof outer panel 58, a press-molded member having a hat-shaped cross section and elongated in the vehicle width direction, as illustrated in FIG. 6. In the present example, the installation position of the main pillar 32 overlaps with the roof cross member 60 in a plan view. Such a configuration makes it possible to improve the rigidity of the main pillar 32. In addition, overlapping the main pillar 32 with the roof cross member 60 effectively prevents bending of the ceiling or the like because the load transmitted to the roof cross member 60 (for example, the impact load acting when the drone 100d takes off and lands thereon) is easily distributed to the lower side of the vehicle.

Figure 7:
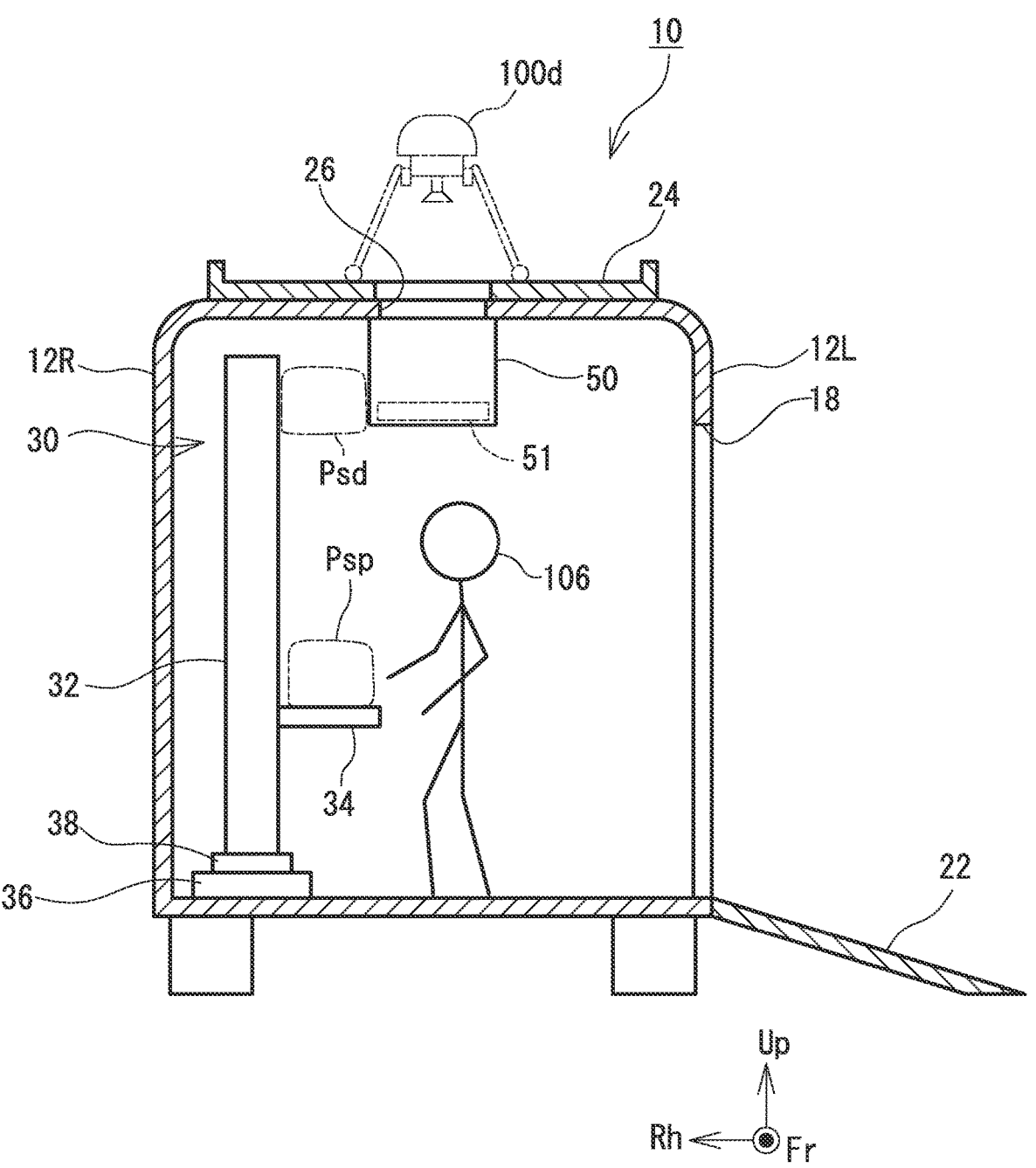
FIG. 7 is a vertical cross-sectional diagram illustrating another example of the parcel delivery vehicle.

The above-described arrangement relationship between the main pillar 32 and the skeleton member is a mere example and, understandably, this arrangement relationship may be changed appropriately. For example, since the main pillar 32 is required to be fixed to the floor surface at the lower end thereof, the upper end of the main pillar 32 may not be fixed to the ceiling, as illustrated in FIG. 7. If the upper end of the main pillar 32 is not fixed to the ceiling, the load transmitted to the ceiling (for example, the impact load acting when the drone 100d takes off and lands thereon) will be less likely transmitted to the main pillar 32.

Although the example of using the unmanned transport device 100 for delivering parcels has been described, the unmanned transport device 100 may be replaced at least partly by a worker who delivers parcels. In this case, as illustrated in FIG. 7, a worker dedicated delivery reception position Psp for delivering and receiving each parcel to and from a worker 106 is set to a height that the worker can easily access (for example, the same height as a person's abdomen), immediately to the left side of the main pillar 32. The worker dedicated delivery reception position Psp is a type of second delivery reception position Ps set between the parcel handling device 30 and the door opening 18. Even when the worker 106 delivers parcels in this manner, performing parcel handling jobs with the parcel handling device 30 can reduce the work amount of the worker 106 and can accordingly reduce the man power.

Further, the installation position of the parcel storage compartment 40 is not specifically limited as long as the parcel storage compartment 40 is located on at least one of the front and rear sides of the parcel handling device 30. Accordingly, for example, if the vehicle 10 is a fully autonomous vehicle that can travel with no driver staying in the vehicle, the driver's seat area Ad illustrated in FIGS. 3 and 4 may be changed to the parcel storage compartment 40. That is, the parcel storage compartment 40 may be provided on both the front and rear sides of the parcel handling device 30.

Figure 8:
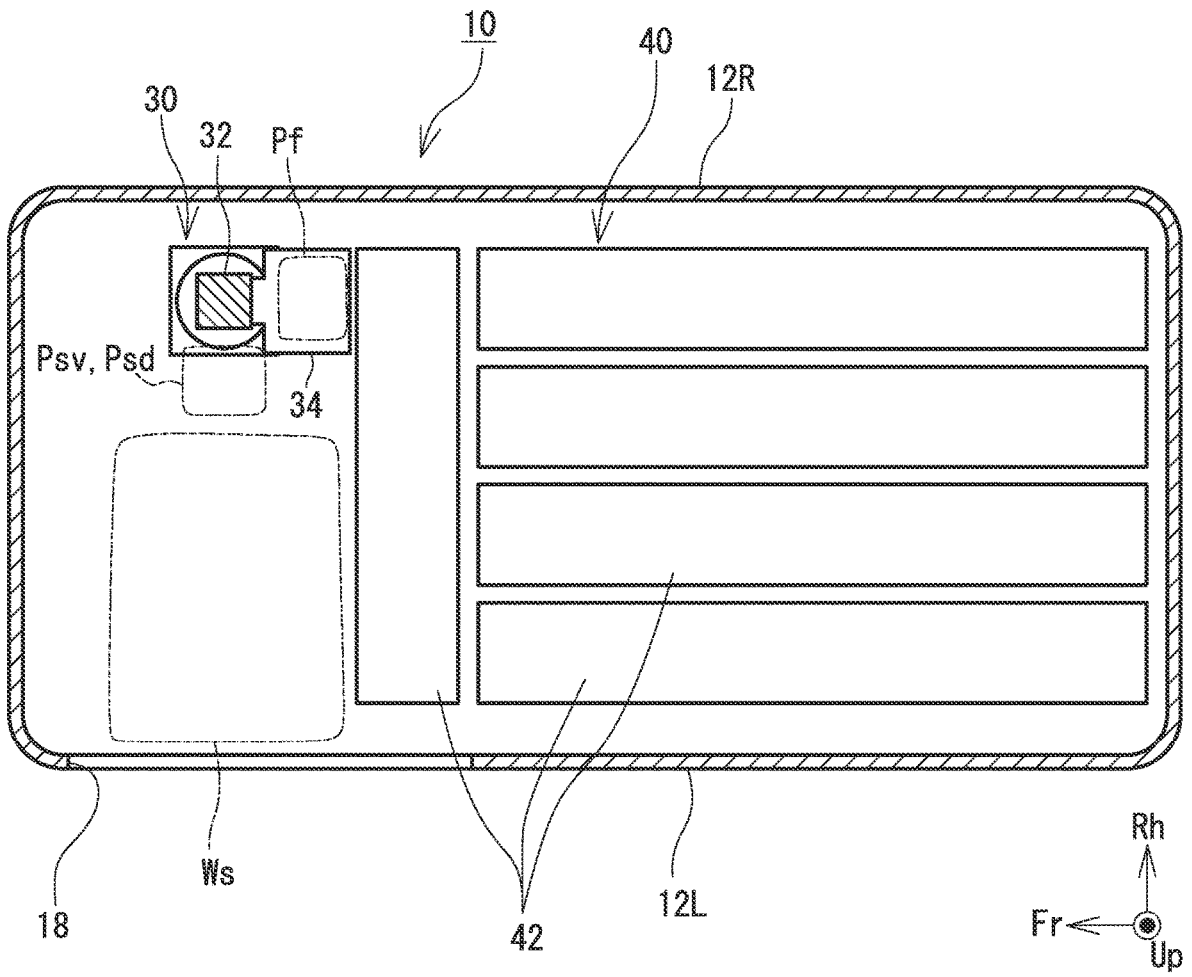
FIG. 8 is a transversal cross-sectional diagram illustrating another example of the parcel delivery vehicle.

Further, the arranging position of the door opening 18 is not specifically limited as long as the door opening 18 is located in the side part of the vehicle 10. Accordingly, as illustrated in FIG. 8, the door opening 18 may be provided in the front part of the vehicle 10. The vehicle 10 illustrated in FIG. 8 is a fully autonomous vehicle that can travel with no driver staying in the vehicle. In this case, the parcel handling device 30 is similar to the door opening 18 in installation position because the parcel handling device 30 is in the front part of the vehicle 10. Further, the parcel storage compartment 40 may be provided on the rear side of the parcel handling device 30, that is, in a central part and a rear part of the vehicle 10 in the back-and-forth direction. Further, although the case of transferring parcels from the vehicle 10 to the unmanned transport device 100 or a worker has been described above, the vehicle 10 disclosed in the present specification is also applicable to a case where parcels are transferred from the unmanned transport device 100 or a worker to the vehicle 10. In this case, parcels carried in from outside the vehicle by the unmanned transport device 100 or a worker are received by the parcel handling device 30. The parcel handling device 30 transfers the received parcels to the conveyance shelf 42 of the parcel storage compartment 40.

REFERENCE SIGNS LIST

10: vehicle
12L: left side part
12R: right side part
18: door opening
20: door
24: drone port
26: roof opening
30: parcel handling device
32: main pillar
34: parcel holding part
36: base
38: rotary table
40: parcel storage compartment
42: conveyance shelf
50: auxiliary parcel handling device
51: pallet
52: floor panel
54: cross member
56: roof inner panel
58: roof outer panel
60: roof cross member
100*d*: drone
100*v*: UGV
106: worker
Ad: driver's seat area
Pf: first delivery reception position
Psd: drone dedicated delivery reception position (second delivery reception position)
Psp: worker dedicated delivery reception position (second delivery reception position)
Psv: UGV dedicated delivery reception position (second delivery reception position)
WS: work space

The invention claimed is:

1. A parcel delivery vehicle comprising:
a door opening provided in a first side part of a vehicle so as to be opened and closed with a door;
a parcel storage compartment provided inside the vehicle to store a parcel; and
a parcel handling device configured to convey the parcel between a first delivery reception position and a second delivery reception position and deliver and receive the parcel to and from the parcel storage compartment at the first delivery reception position, in which
the parcel storage compartment is provided on a front side or a rear side, or on both of the front and rear sides, of the parcel handling device in the vehicle, the parcel handling device includes a main pillar with a lower end fixed to a vehicle interior floor surface and provided in a vicinity of a second side part that is a side part opposite to the first side part in the vehicle and at a position facing the door opening in a vehicle width direction, and
the second delivery reception position is set between the parcel handling device and the door opening.

2. The parcel delivery vehicle according to claim 1, in which
a work space that is a space extending from the parcel handling device to the door opening is not provided with the parcel storage compartment, and
the vehicle interior floor surface of the work space is flat.

3. The parcel delivery vehicle according to claim 1, in which
the parcel is delivered in cooperation with an unmanned transport device,
the unmanned transport device includes a drone, and
the parcel delivery vehicle further includes
a drone port provided on an outer surface of a ceiling of the vehicle to enable the drone to land thereon,
a roof opening formed in the ceiling so that the parcel can pass, and
an auxiliary parcel handling device configured to transport the parcel received from either the parcel handling device or the drone through the roof opening and transfer the parcel to the other of the parcel handling device and the drone.

4. The parcel delivery vehicle according to claim 3, in which
the roof opening is formed so as to be positioned at substantially a center in the vehicle width direction.

5. The parcel delivery vehicle according to claim 3, in which
the unmanned transport device further includes an unmanned ground vehicle that travels unmanned on roads,
the second delivery reception position includes a UGV dedicated delivery reception position where the parcel is delivered to and received from the unmanned ground vehicle, and a drone dedicated delivery reception position where the parcel is delivered to and received from the auxiliary parcel handling device, and
the UGV dedicated delivery reception position and the drone dedicated delivery reception position are matched in a horizontal direction and are offset in a vertical direction.

6. The parcel delivery vehicle according to claim 1, in which the parcel handling device includes:
a parcel holding part that holds the parcel, rotates about the main pillar, and moves up and down along the main pillar, in which the parcel holding part is rotated and moved up and down, after the parcel is received at one of the first delivery reception position and the second delivery reception position, so that the parcel is conveyed to the other of the first delivery reception position and the second delivery reception position.

7. The parcel delivery vehicle according to claim 1, in which
the vehicle has a cross member as a skeleton member extending in the vehicle width direction in a bottom part of the vehicle, and
the main pillar is provided at a position overlapping with the cross member in a plan view.

8. The parcel delivery vehicle according to claim 1, in which the main pillar has an upper end fixed to a ceiling of the vehicle.

9. The parcel delivery vehicle according to claim 8, in which the vehicle has a roof cross member as a skeleton member extending in the vehicle width direction, in a top part of the vehicle, and the main pillar is provided at a position overlapping with the roof cross member, in a plan view.

10. The parcel delivery vehicle according to claim 1, in which the main pillar has an upper end not fixed to a ceiling of the vehicle.

* * * * *